US012066658B2

(12) United States Patent
Kuo et al.

(10) Patent No.: US 12,066,658 B2
(45) Date of Patent: Aug. 20, 2024

(54) INTEGRATED OPTICAL DEVICES AND METHODS OF FORMING THE SAME

(71) Applicant: Taiwan Semiconductor Manufacturing Company, Ltd., Hsinchu (TW)

(72) Inventors: Feng-Wei Kuo, Hsinchu County (TW); Wen-Shiang Liao, Miaoli County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 29 days.

(21) Appl. No.: 17/725,558

(22) Filed: Apr. 21, 2022

(65) Prior Publication Data

US 2023/0341624 A1    Oct. 26, 2023

(51) Int. Cl.
| G02B 6/12 | (2006.01) |
| G02B 6/124 | (2006.01) |
| G02B 6/13 | (2006.01) |

(52) U.S. Cl.
CPC ............... G02B 6/124 (2013.01); G02B 6/13 (2013.01); *G02B 2006/12107* (2013.01)

(58) Field of Classification Search
CPC . G02B 6/124; G02B 6/13; G02B 2006/12107
USPC .......................................................... 385/37
See application file for complete search history.

(56) References Cited

U.S. PATENT DOCUMENTS

| 2003/0215724 A1* | 11/2003 | Asano ................. G03F 7/70625 430/30 |
| 2016/0231258 A1* | 8/2016 | Wen ...................... G01N 23/041 |
| 2023/0003943 A1* | 1/2023 | Zhu ...................... H01L 27/1203 |

* cited by examiner

*Primary Examiner* — Jerry M Blevins
(74) *Attorney, Agent, or Firm* — JCIPRNET

(57) ABSTRACT

An integrated optical device includes a substrate, a waveguide structure and a grating structure. The substrate has a waveguide region and a grating region adjacent to each other. The waveguide structure is disposed on the substrate in the waveguide region. The grating structure is disposed on the substrate in the grating region. In some embodiments, the grating structure includes grating bars and grating intervals arranged alternately, and widths of the grating bars of the grating structure are varied.

20 Claims, 15 Drawing Sheets

INTEGRATED OPTICAL DEVICES AND METHODS OF FORMING THE SAME

BACKGROUND

Integrated optical devices such as grating coupler structures are frequently used to enable communication between light sources and other components (e.g., photo-detectors). For example, an optical grating structure can be used to redirect light from an optical fiber into an optical detector. Although the existing grating coupler structures have been generally adequate for their intended purposes, they have not been entirely satisfactory in all respects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
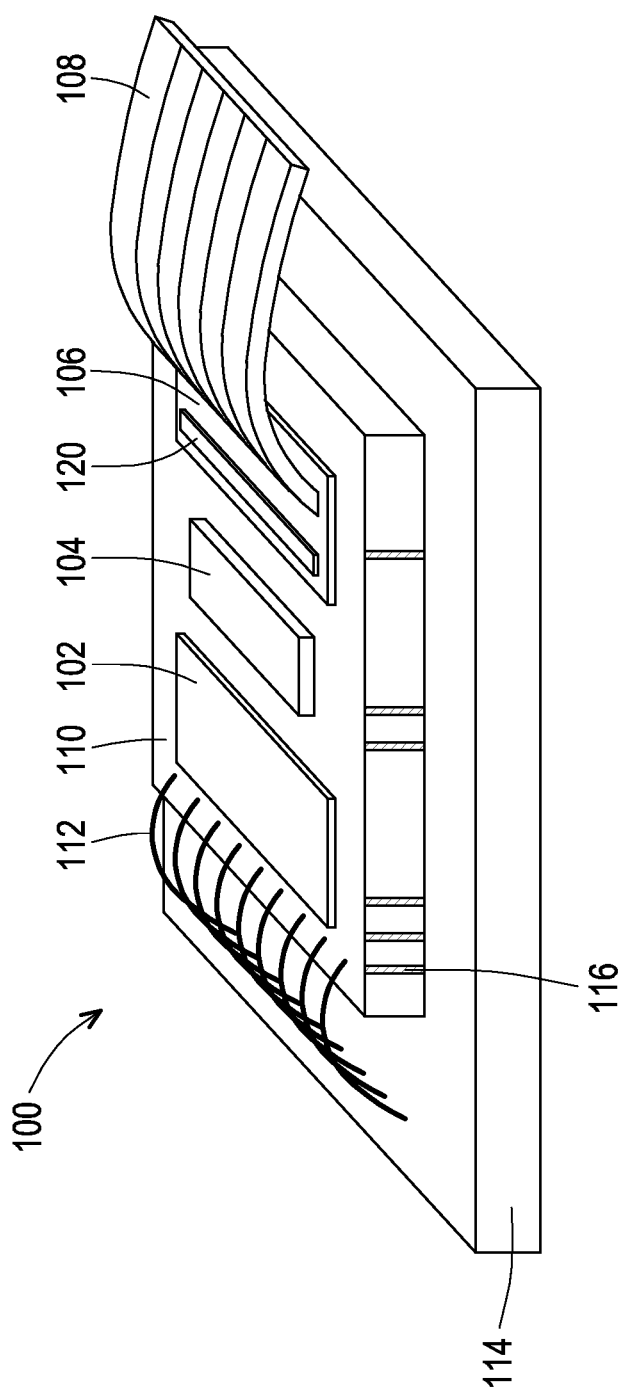
FIG. 1 illustrates a simplified perspective view of an exemplary integrated optical device in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In addition, terms, such as "first," "second," "third," "fourth," and the like, may be used herein for ease of description to describe similar or different element(s) or feature(s) as illustrated in the figures, and may be used interchangeably depending on the order of the presence or the contexts of the description.

FIG. 1 illustrates a simplified perspective view of an exemplary integrated optical device in accordance with some embodiments of the present disclosure. It is noted that the integrated optical device 100 is merely an example, and is not intended to limit the present disclosure. Accordingly, it is understood that additional functional components may be provided in or coupled to the integrated optical device 100 of FIG. 1 as needed.

Referring to FIG. 1, the integrated optical device 100 includes an electronic die 102, a light source die 104, a photonic die 106, an interposer 110 and a board substrate 114. The electronic die 102, the light source die 104 and the photonic die 106 are coupled together through input/output interfaces (not shown) on the interposer 110. In some embodiments, the interposer 110 is fabricated using silicon. In some embodiments, the interposer 110 includes at least one of the following: interconnecting routing, through silicon vias (TSVs), and contact pads. In some embodiments, the interposer 110 is to integrate all components including the electronic die 102, the light source die 104, and the photonic die 106 together. In some embodiments, each of the dies 102/104/106 are coupled to the interposer 110 using a flip-chip bonding method. In some embodiments, high density solder micro-bumps such as controlled collapse chip connection (C4) bumps are used to couple the dies 102/104/106 to the interposer 110. Further, the interposer 110 is coupled to the board substrate 114 such as a printed circuit board (PCB) substrate through wire bonding 112 or through silicon-vias (TSVs) 116 using soldering balls. The TSVs 116 can include electrically conductive paths that extend vertically through the interposer 110 and provide electrical connectivity between the electronic die 102 and the board substrate 114.

In some embodiments, the board substrate 114 can include a support structure for the device 100, and can include both insulating and conductive material for isolation devices as well as providing electrical contact for active devices on the photonic die 106 as well as circuits/devices on the electronic die 102 via the interposer 110. Further, the board substrate 114 can provide a thermally conductive path to carry away heat generated by devices and circuits in the electronic die 102 and the light source die 104.

In some embodiments, the electronic die 102 includes circuits (not shown) such as amplifiers, control circuit, digital processing circuit, etc. The electronic die 102 further includes at least one electronic circuit (not shown) that provides the required electronic function of the device 100 and driver circuits for controlling the light source 104 or elements in the photonic die 106.

In some embodiments, the light source die 104 includes a plurality of components (not shown), such as at least one light emitting element (e.g., a laser or a light-emitting diode), transmission elements, modulation elements, signal processing elements, switching circuits, amplifier, input/output coupler, and light sensing/detection circuits. In some embodiments, each of the at least one light-emitting element in the light source die 104 can include solid-state inorganic, organic or a combination of inorganic/organic hybrid semiconducting materials to generate light. In some embodiments, the light source die 104 is disposed aside the photonic die 106. However, the disclosure is not limited thereto. In other embodiments, the light source die 104 is disposed on the photonic die 106.

In some embodiments, the photonic die 106 includes an optical fiber array 108, and a grating coupler structure 120. The grating coupler structure 120 is referred to as a "fiber-to-chip grating coupler" in some examples. In some embodiments, the grating coupler structure 120 is configured to couple the light source die 104 and the optical fiber array 108. In some embodiments, the optical fiber array 108 includes a plurality of optical fibers and each of them can be a single-mode or a multi-mode optical fiber. In some embodiments, the optical fiber array 108 can be epoxied on the photonic die 106.

In some embodiments, the photonic die 106 further includes components (not shown) such as a laser driver, digital control circuit, photo-detectors, waveguides, small form-factor pluggable (SFP) transceiver, high-speed phase modulator (HSPM), calibration circuit, distributed Mach-Zehnder Interferometer (MZI), etc. Each of the grating coupler structure 120 enables the coupling of optical signals between the optical fiber array 108 and the light source die 104 or corresponding photo-detectors on the photonic die 106.

In some embodiments, the grating coupler structure 120 includes a grating structure and a waveguide structure with designs to reduce refractive index contrast to reduce back reflection losses providing improved coupling efficiency between the optical fiber on the corresponding waveguide, which are discussed in details below in various embodiments of the present disclosure.

During operation, optical signals received from a remote server attached on one end of the optical fiber array 108 can be coupled through the grating coupler structure 120 attached to the other end of the optical fiber array 108 to the corresponding photo-detectors on the photonic die 106. Alternatively, optical signals received from the light source die 104 can be coupled through the grating coupler structure 120 to the optical fiber array 108 which can be further transmitted to the remote server. In some embodiments, the optical fiber of the optical fiber array 108 receives the optical field at an angle (between an axis of the optical fiber and the y-axis perpendicular to the surface of the substrate). In some embodiments, the angle of the optical fiber of the optical fiber array 108 can be configured in a range of about 0-45 degrees, such as about 5-15 degrees, according to the structural, geometric, material properties of the grating coupler structure 120.

Figure 2:
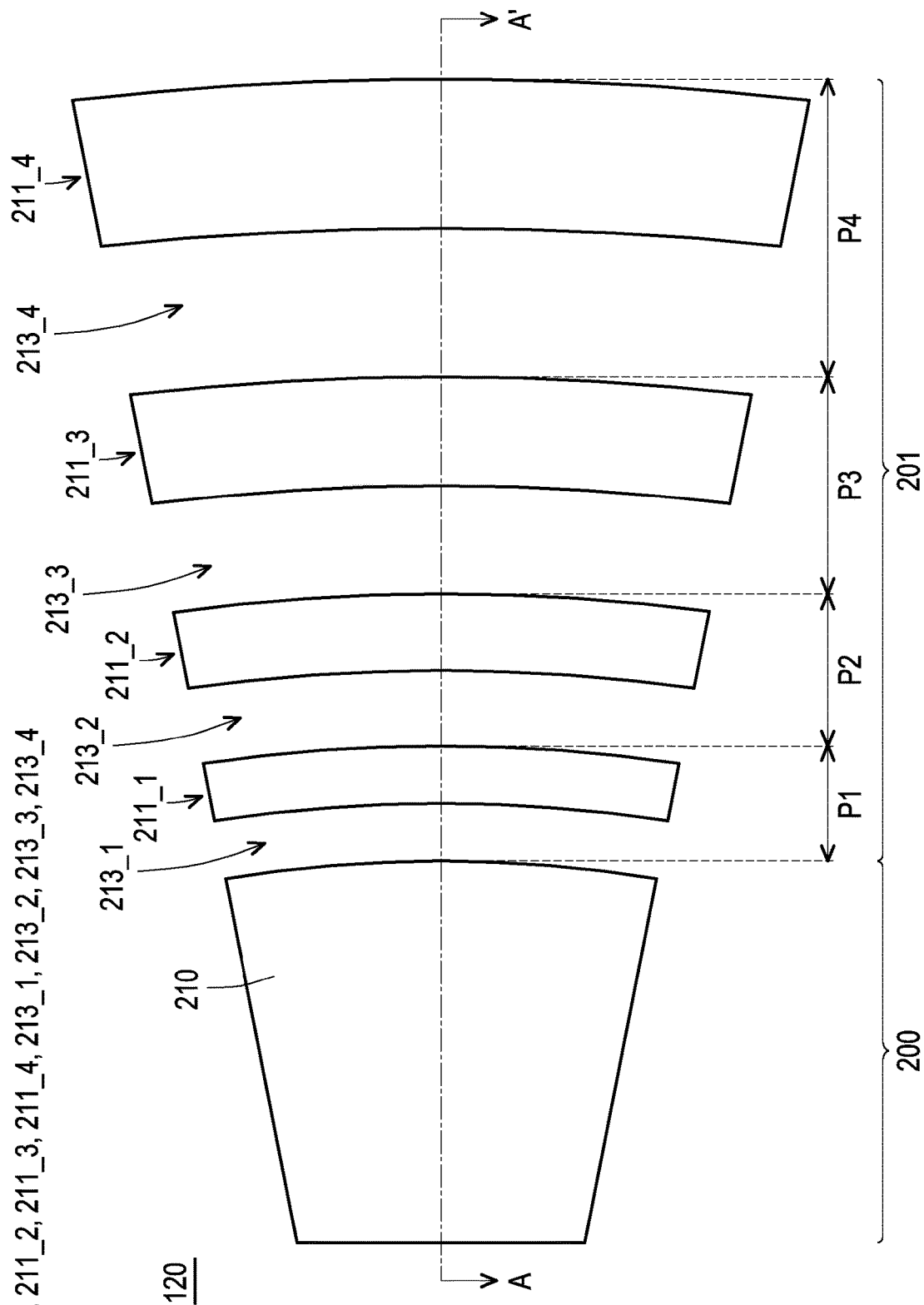
FIG. 2 illustrates a simplified top view of an exemplary grating coupler structure in accordance with some embodiments of the present disclosure.

FIG. 2 illustrates a simplified top view of an exemplary grating coupler structure in accordance with some embodiments of the present disclosure.

Referring to FIG. 2, in some embodiments, a grating coupler structure 120 includes a waveguide region 200 and a grating region 201 adjacent to each other. A waveguide structure 210 is disposed in the waveguide region 200, and a grating structure 212 is disposed in the grating region 201.

The grating structure 212 includes a plurality of grating bars 211_1 to 211_4 and a plurality of grating intervals 213_1 to 213_4 alternately arranged. In the illustrated embodiments, four grating bars are provided for illustration purposes and are not intended to limit the present disclosure. Specifically, the number of the grating bars is not limited by the present disclosure. Any number of grating bars in the grating structure 212 can be used and is within the scope of this disclosure.

In some embodiments, the grating bars 211_1 to 211_4 are curved bars from a top view. However, the disclosure is not limited thereto. In other embodiments, the grating bars 211_1 to 211_4 are straight bars from a top view.

In the disclosure, the grating structure 120 have non-periodic grating bars 211_1 to 211_4 and/or non-periodic grating intervals 213_1 to 213_4, so as to produce the desired intensity profile along the propagation direction (or called the radius direction) to the waveguide structure 210. The desired intensity profile determines a position of an optical fiber (not shown) in the optical fiber array 108 on top of the grating structure 120 so as to efficiently couple the optical field from the chip to the optical fiber. In some embodiments, the number of non-periodic grating bars 211_1 to 211_4 can be determined according to the shape, geometry and materials of the grating bars, as well as a desired operational wavelength range, etc.

The non-periodic features are defined as features (e.g., grating bars or grating intervals) disposed in an irregular manner. Specifically, the grating bars or grating intervals are not arranged periodically or regularly along the propagation direction (or called the radius direction) to the waveguide structure 210.

In some embodiments, the pitch is defined as the distance between repeated features (e.g., grating bars). In the disclosure, the grating bars are designed to have different pitches so as to produce the desired intensity profile along the propagation direction (or called the radius direction) to the waveguide structure. In some embodiments, the pitch is the feature width (e.g., grating bar width) plus the intermediate space width (e.g., grating interval width) between adjacent feature widths.

In some embodiments, as shown in FIG. 2, the pitch P4 of the grating bar 211_4 is different from (e.g., greater than) the pitch P3 of the grating bar 211_3, the pitch P3 of the grating bar 211_3 is different from (e.g., greater than) the pitch P2 of the grating bar 211_2, the pitch P2 of the grating bar 211_2 is different from (e.g., greater than) the pitch P1 of the grating bar 211_1. The disposition of the grating bars is not limited by FIG. 2, which are discussed in details below in various embodiments of the present disclosure.

FIG. 3 to FIG. 7 illustrate a method of forming an exemplary grating coupler structure along the radius direction A-A' of FIG. 2 in accordance with some embodiments of the present disclosure. In the illustrated embodiments, a grating coupler structure 120 fabricated on a semiconductor substrate and embedded by insulating layers.

Figure 3:
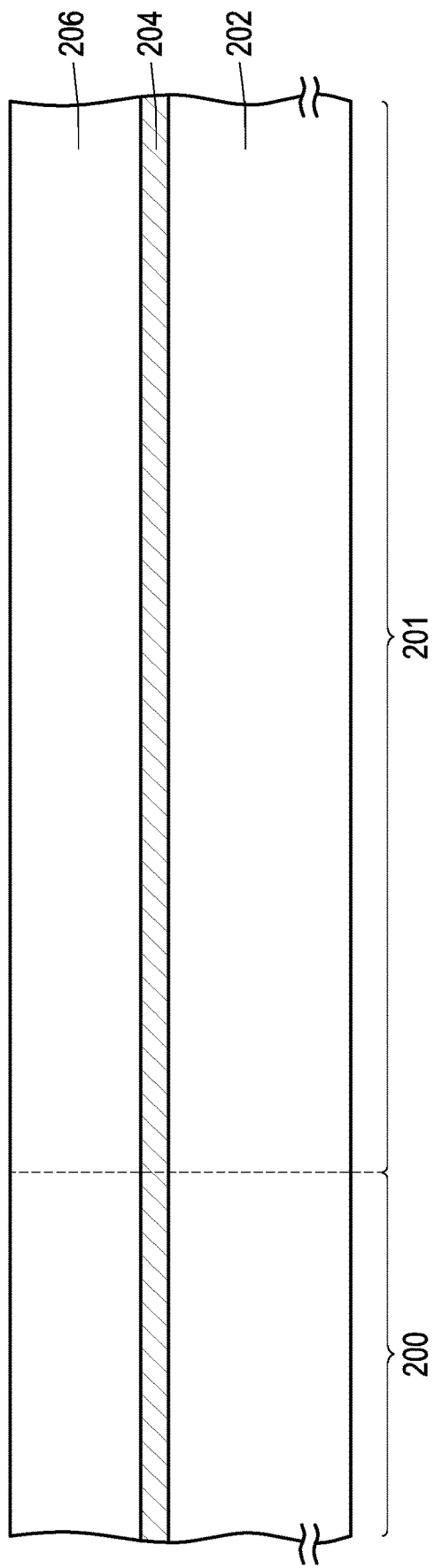
FIG. 3 to FIG. 7 illustrate a method of forming an exemplary grating coupler structure in accordance with some embodiments of the present disclosure.

Referring to FIG. 3, a semiconductor substrate 202 is provided. In some embodiments, the semiconductor substrate 202 is a silicon substrate. In other embodiments, the semiconductor substrate 202 may include other elementary semiconductor material such as, for example, germanium. The semiconductor substrate 202 may also include a compound semiconductor such as silicon carbide, gallium arsenic, indium arsenide, and indium phosphide. The semiconductor substrate 202 may include an alloy semiconductor such as silicon germanium, silicon germanium carbide, gallium arsenic phosphide, and gallium indium phosphide. The semiconductor substrate 202 may take the form of a planar substrate, a substrate with multiple fins, nanowires or any other form known to people having ordinary skill in the art. Depending on the requirements of design, the semiconductor substrate 202 may be a P-type substrate or an N-type substrate and may have doped regions therein. The doped regions may be configured for an N-type device or a P-type device. In some embodiments, the semiconductor substrate 202 has a waveguide region 200 and a grating region 201 adjacent to each other. For example, the waveguide region 200 and the grating region 201 are laterally disposed side by side.

Thereafter, a first metal layer 202 is formed on a semiconductor substrate 202. In some embodiments, the first metal layer 202 serves as a bottom reflection layer to reflect transmitted light from the grating back to the grating. In some embodiments, the first metal layer 204 includes at least one of the following: Al, Cu, Ni, and a combination. In some embodiments, the first metal layer 204 is formed on the semiconductor substrate 202 using one of the following techniques: chemical vapor deposition (CVD), physical vapor deposition (PVD), evaporation, etc. In some embodiments, the first metal layer 204 has a thickness of about 0.1-5 um.

Afterwards, a first insulating layer 206 is formed over the semiconductor substrate 200, covering the first metal layer 204. In some embodiments, the first insulating layer 206 is a silicon oxide layer. In some embodiments, the first insulating layer 206 is fabricated on the semiconductor substrate 202 using chemical vapor deposition (CVD), physical vapor deposition (PVD), or the like. In some embodiments, the first insulating layer 206 has a thickness of about 5-15 um, such as about 2-10 um. In some embodiments, the first insulating layer 206 can be replaced by other types of dielectric materials, such as silicon nitride, aluminum oxide, or the like, according to the application.

Figure 4:
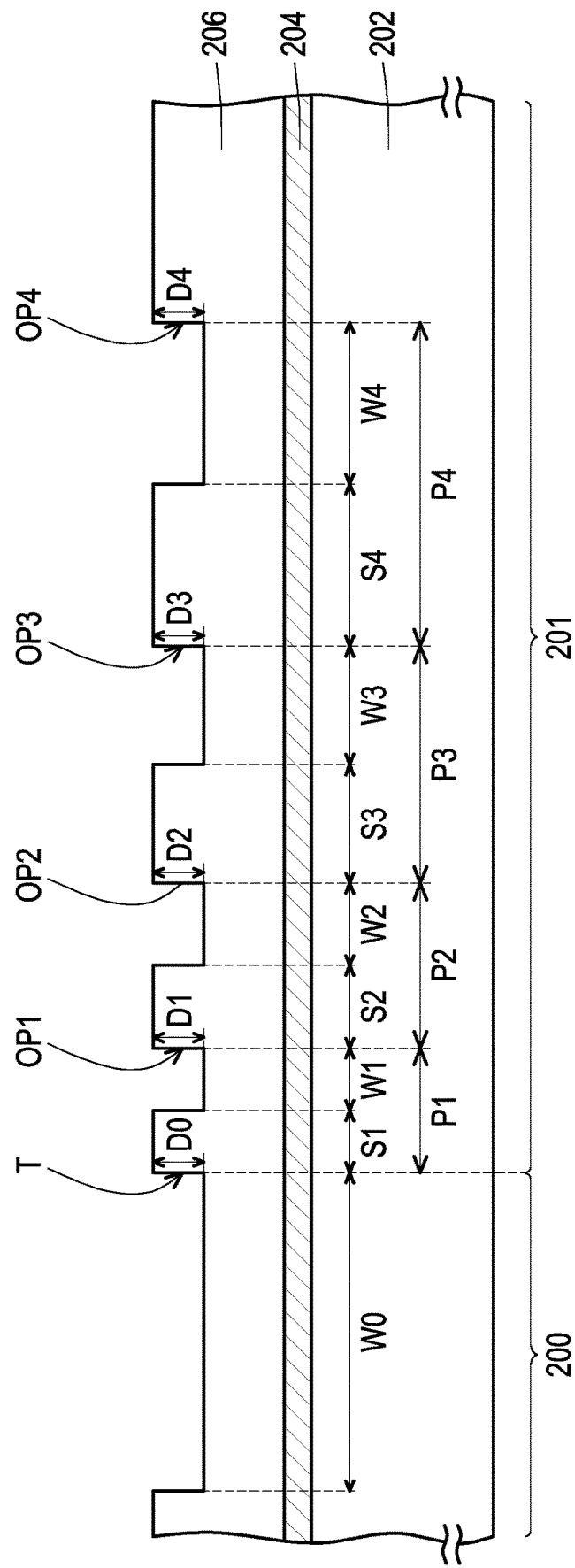

Referring to FIG. 4, the first insulating layer 206 is patterned to form a waveguide trench T in the first insulating layer 206 in the waveguide region 200 and multiple grating openings OP1-OP4 in the first insulating layer 206 in the grating region 201. The patterning process includes photolithography and etching processes. In some embodiments, a photoresist layer or a mask layer (not shown) is formed on the first insulating layer, and portions of the first insulating layer are removed by using the photoresist layer or a mask layer as an etching mask. In some embodiments, portions of the first insulating layer are removed by a time-mode dry etching or a reactive ion etching (RIE), and the etching gas includes a halogen-containing gas, such as $F_2$, $CH_3F$, $CH_2Cl_2$, $CH_3Cl$, $Cl_2$, the like or a combination thereof.

In some embodiments, the first pitch P1 includes a width W1 of the grating opening OP1 plus a distance S1 between the waveguide trench T and the grating opening OP1, the second pitch P2 includes a width W2 of the grating opening OP2 plus a distance S2 between the grating opening OP2 and the grating opening OP1, the third pitch P3 includes a width W3 of the grating opening OP3 plus a distance S3 between the grating opening OP3 and the grating opening OP2, and the fourth pitch P4 includes a width W4 of the grating opening OP4 plus a distance S4 between the grating opening OP4 and the grating opening OP3. In some embodiments, the first to fourth pitches P1 to P4 of the grating openings OP1 to OP2 are varied and non-constant. In some embodiments, the first to fourth pitches P1 to P4 are gradually increased away from the waveguide trench T. Specifically, the first pitch P1 is less than the second pitch P2, the second pitch P2 is less than the third pitch P3, and the third pitch P3 is less than the fourth pitch P4.

In some embodiments, the width W1 of the grating opening OP1 is less than the width W2 of the grating opening OP2, the width W2 of the grating opening OP2 is less than the width W3 of the grating opening OP3, and the width W3 of the grating opening OP3 is less than the width W4 of the grating opening OP4. In some embodiments, the distance S1 between the waveguide trench T and the grating opening OP1 is less than the distance S2 between the grating opening OP2 and the grating opening OP1, and the distance S2 between the grating opening OP2 and the grating opening OP1 is less than the distance S3 between the grating opening OP3 and the grating opening OP2, and the distance S3 between the grating opening OP3 and the grating opening OP2 is less than the distance S4 between the grating opening OP4 and the grating opening OP3. However, the disclosure is not limited thereto. In other embodiments, the widths W1 to W4 are not-constant, but the distances S1 to S4 are constant. In other embodiments, the widths W1 to W4 are constant, but the distances S1 to S4 are not-constant.

In some embodiments, the depth D0 of the waveguide trench T is substantially the same as the depth D1 of the grating opening OP1, the depth D2 of the grating opening OP2, the depth D3 of the grating opening OP3, and the depth D4 of the grating opening OP4. However, the disclosure is not limited thereto. In other embodiments, the depth D0 of the waveguide trench T is different from (e.g., deeper than) at least one of the depth D1 of the grating opening OP1, the depth D2 of the grating opening OP2, the depth D3 of the grating opening OP3, and the depth D4 of the grating opening OP4.

In some embodiments, the widths W1 to W4 of the grating openings OP1 to OP4 range from about 10 to 1000 nm, such as 90-150 nm, and depths D1 to D4 of the grating openings OP1 to OP4 range from about 100 to 1000 nm, such as 200-300 nm. In some embodiments, the total width of the grating openings is less than about 600 nm for 1310 nm to 1500 nm wavelength light. Other values and ranges may be applicable.

Figure 5:
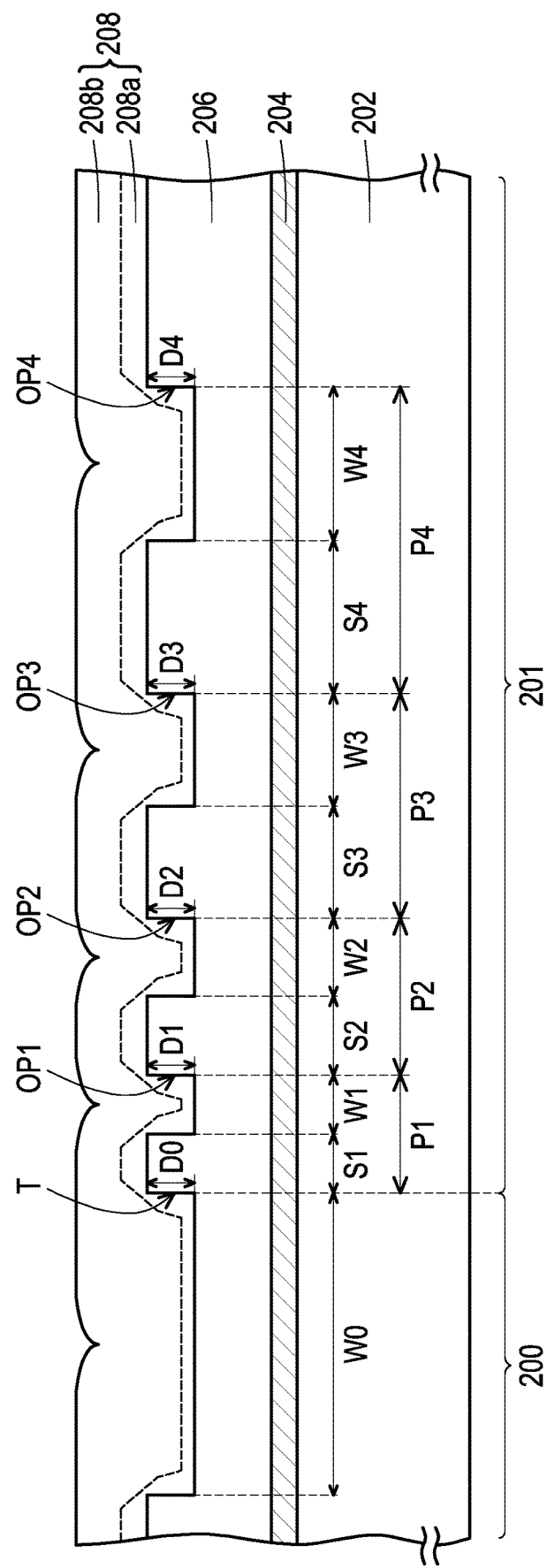

Referring to FIG. 5, a high density plasma chemical vapor deposition (HDP-CVD) process is performed to form a filling layer 208 over the first insulating layer 206 and in the waveguide trench T and the grating openings OP1-OP4. In some embodiments, the HDP-CVD process includes deposition and sputtering cycles. Specifically, the HDP-CVD process may be performed by alternating deposition mode (such as PECVD method) and sputtering mode (such as bias sputtering method), where a deposition rate within the deposition mode is greater than a sputtering rate within the sputtering mode. In some embodiments, a first deposition step is performed to form a first material in the trench and openings, and a first sputtering step is performed to partially remove the first material around top corners of the trench and openings. Accordingly, a first filling layer 208a is formed in the waveguide trench T and the grating openings OP1-OP4. In some embodiments, the first filling layer 208a has a uniform bottom thickness and a tapered sidewall thickness in the waveguide trench T and the grating openings OP1-OP4. In some embodiments, a second deposition step is performed to form a second material over the first filling layer 208a and in the trench and openings, and a second sputtering step is optionally performed to partially remove the second material around top corners of the trench and openings. Accordingly, a second filling layer 208b is formed over the first filling layer 208a and in the trench and the openings. In some embodiments, the second filling layer 208b fills up the waveguide trench T and the grating openings OP1-OP4. In some embodiments, each of the first filling layer 208a and the second filling layer 208b has a thickness of about 100-1000 nm, such as more than 300 nm. In some embodiments, the first filling layer 208a and the second filling layer 208b constitute a void-free filling layer 208.

In some embodiments, the first filling layer 208a and the second filling layer 208b include a material different from the material of the first insulating layer 206. In some embodiments, the first filling layer 208a and the second filling layer 208b are made by the same material, so the interface between the first filling layer 208a and the second filling layer 208b is invisible. For example, the first filling layer 208a and the second filling layer 208b includes silicon (e.g., polysilicon or amorphous silicon), silicon nitride, silicon oxynitride, silicon carbide, or the like. However, the disclosure is not limited thereto. In other embodiments, the first filling layer 208a and the second filling layer 208b are made by different materials, which are discussed in details below in various embodiments of the present disclosure.

The above embodiments in which the cycles of deposition and sputtering steps are performed twice are provided for illustration purposes, and are not construed as limiting the present disclosure. The cycles of deposition and sputtering steps may be performed as many times as needed. For example, the cyclic deposition and sputtering process may include m cycles of deposition and sputtering steps, and m is a positive integer. For examples, m is an integer from 2 to 5.

Figure 6:
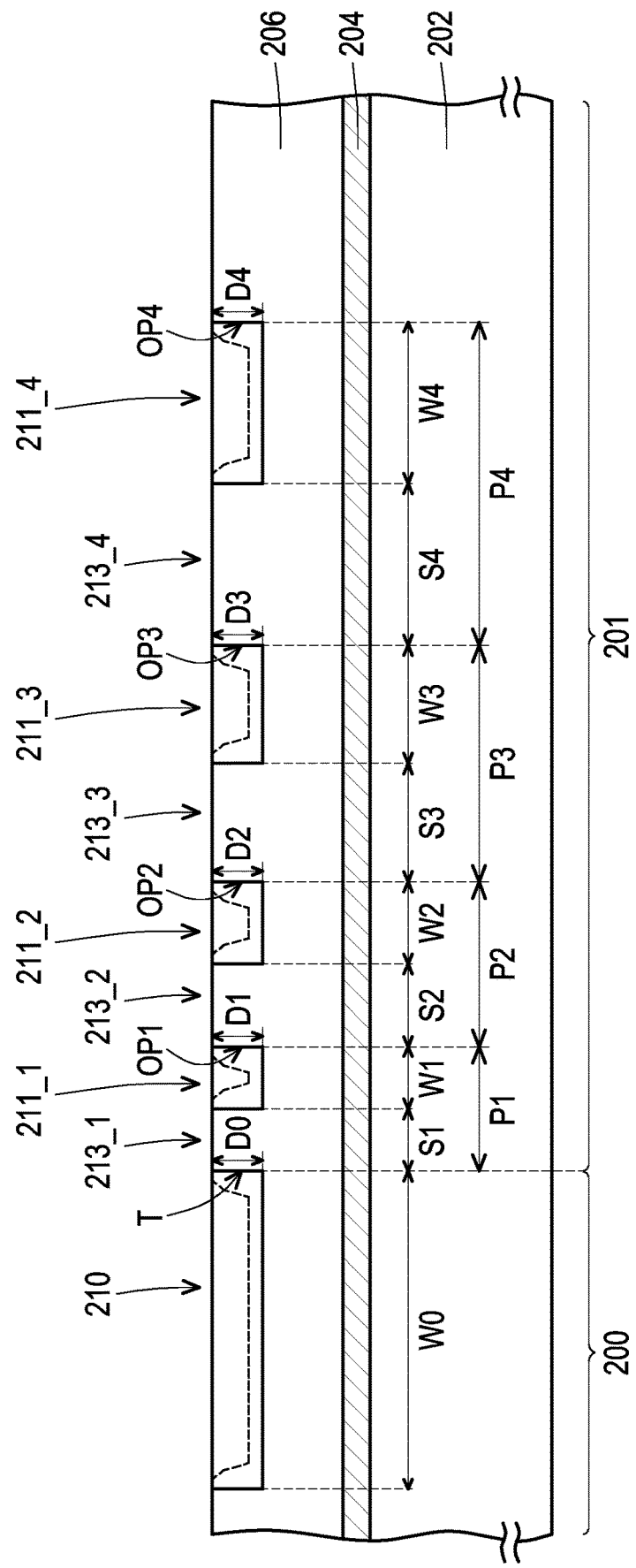

Referring to FIG. 6, a planarization process is performed to the first filling layer 208a and the second filling layer 208b. In some embodiments, the first filling layer 208a and the second filling layer 208b outside of the trench and openings are removed by a planarization process, such as a chemical mechanical polishing (CMP) process. Accordingly, a waveguide structure 210 is formed in the waveguide trench T in the waveguide region 200, and multiple grating bars 211_1 to 211_4 are formed in the grating openings OP1 to OP4 respectively in the grating region 201. In some embodiments, the grating bars 211_1 to 211_4 and grating intervals 213_1 to 213_4 constitute a grating structure 212. The grating intervals are referred to as "insulating spacers" in some example.

In the disclosure, the grating bars 211_1 to 211_4 are designed to have different pitches so as to produce the desired intensity profile along the propagation direction (or called the radius direction) to the waveguide structure.

In some embodiments, the first to fourth pitches P1 to P4 of the grating bars 211_1 to 211_4 are varied and non-constant. In some embodiments, the first to fourth pitches P1 to P4 are gradually increased away from the waveguide structure 210. Specifically, the first pitch P1 is less than the second pitch P2, the second pitch P2 is less than the third pitch P3, and the third pitch P3 is less than the fourth pitch P4.

In some embodiments, the width W1 of the grating bar 211_1 is less than the width W2 of the grating bar 211_2, the width W2 of the grating bar 211_2 is less than the width W3 of the grating bar 211_3, and the width W3 of the grating bar 211_3 is less than the width W4 of the grating bar 211_4. In some embodiments, the distance S1 between the waveguide structure 210 and the grating bar 211_1 (e.g., the width of the grating interval 213_1) is less than the distance S2 between the grating bar 211_2 and the grating bar 211_1 (e.g., the width of the grating interval 213_2), and the distance S2 between the grating bar 211_2 and the grating bar 211_1 is less than the distance S3 between the grating bar 211_3 and the grating bar 211_2 (e.g., the width of the grating interval 213_3), and the distance S3 between the grating bar 211_3 and the grating bar 211_2 is less than the distance S4 between the grating bar 211_4 and the grating bar 211_3 (e.g., the width of the grating interval 213_4). However, the disclosure is not limited thereto. In other embodiments, the widths W1 to W4 are not-constant, but the distances S1 to S4 are constant. In other embodiments, the widths W1 to W4 are constant, but the distances S1 to S4 are not-constant.

In some embodiments, the depth D0 of the waveguide structure 210 is substantially the same as the depth D1 of the grating bar 211_1, the depth D2 of the grating bar 211_2, the depth D3 of the grating bar 211_3, and the depth D4 of the grating bar 211_4. However, the disclosure is not limited thereto. In other embodiments, the depth D0 of the waveguide structure 210 is different from (e.g., deeper than) at least one of the depth D1 of the grating bar 211_1, the depth D2 of the grating bar 211_2, the depth D3 of the grating bar 211_3, and the depth D4 of the grating bar 211_4.

In some embodiments, the widths W1 to W4 of the grating bars 211_1 to 211_4 range from about 10 to 1000 nm, such as 90-150 nm, and depths D1 to D4 of the grating bars 211_1 to 211_4 range from about 100 to 1000 nm, such as 200-300 nm. In some embodiments, the total width of the grating bars is less than about 600 nm for 1310 nm to 1500 nm wavelength light. Other values and ranges may be applicable.

Figure 7:
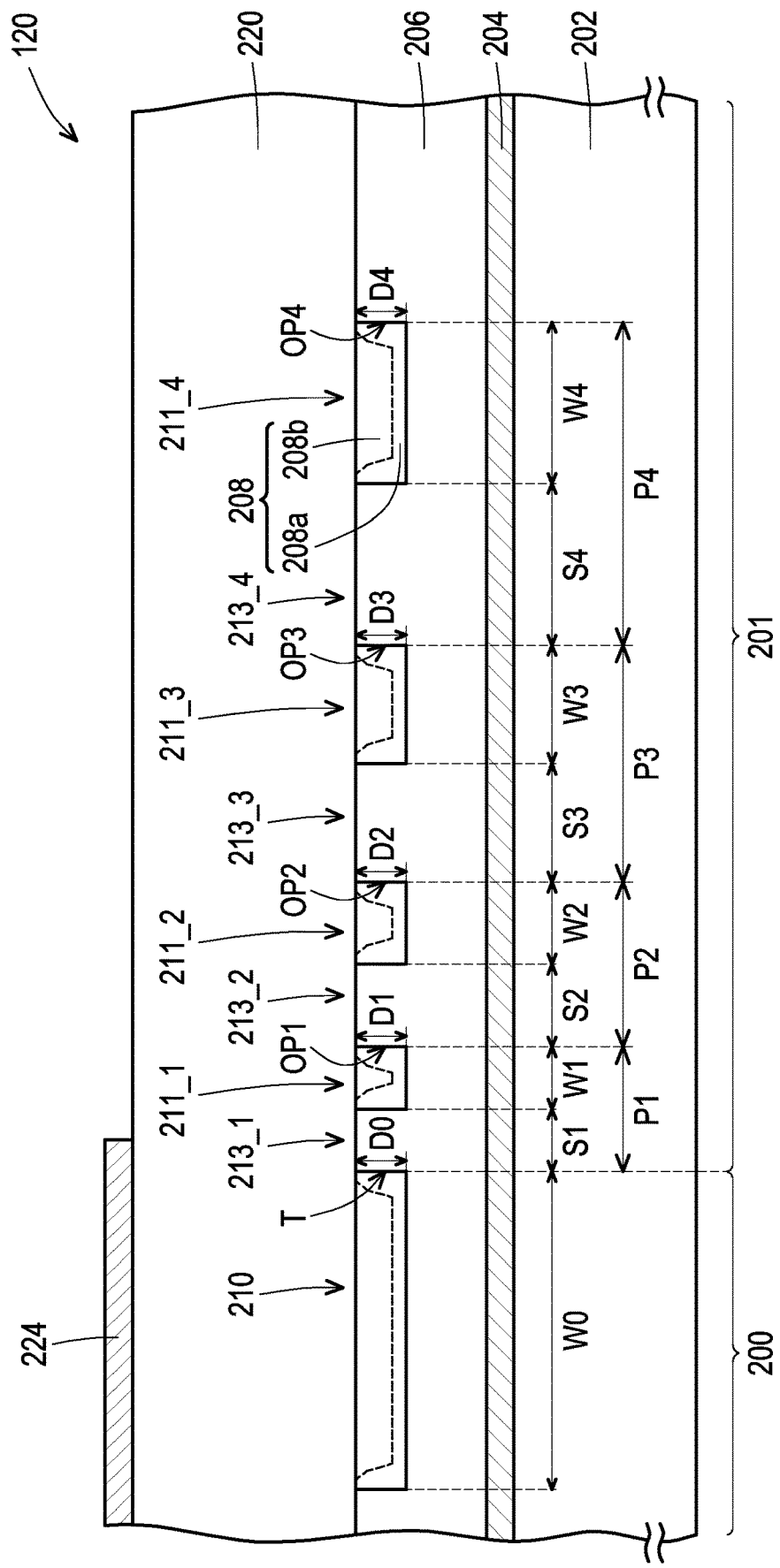

Referring to FIG. 7, a second insulating layer 220 is formed over the first insulating layer 206, covering the waveguide structure 210 and the grating structure 212 including grating bars 211_1 to 211_4. In some embodiments, the second insulating layer 220 is a silicon oxide layer. In some embodiments, the second insulating layer 220 is fabricated on the first insulating layer 206 using chemical vapor deposition, physical vapor deposition, or the like. In some embodiments, the second insulating layer 220 has a thickness of about 5-15 um, such as 2-8 um. In some embodiments, the second insulating layer 220 can be replaced by other types of dielectric materials, such as silicon nitride, aluminum oxide, or the like, according to the application. In some embodiments, the second insulating layer 220 and the first insulating layer 206 include the same material, such as silicon oxide. However, the disclosure is not limited thereto. In other embodiments, the second insulating layer 220 and the first insulating layer 206 include different materials.

Thereafter, a second metal layer 224 is formed on the second insulating layer 220. In some embodiments, the second metal layer 224 serves as a top reflection layer to reflect transmitted light from the waveguide top to the waveguide. In some embodiments, the second metal layer 224 includes at least one of the following: Al, Cu, Ni, and a combination. In some embodiments, the second metal layer 224 is formed on the second insulating layer 220 using one of the follow techniques: chemical vapor deposition (CVD), physical vapor deposition (PVD), evaporation, or the like. In some embodiments, the second metal layer 224 has a thickness of about 0.1-5 um. In some embodiments, the second metal layer 224 is disposed on the second insulating layer 220 in the waveguide region 200. In some embodiments, the second metal layer 224 further extends to the grating region 201, without covering the grating bars 211_1 to 211_4. A grating coupler structure 120 of the disclosure is thus completed.

In some embodiments, the steps of forming the first metal layer 204, the second insulating layer 220 and the second metal layer 224 may be optional and can be omitted as needed.

In some embodiments, the waveguide structure 210 and the grating bars 211_1 to 211_4 are provided with substantially vertical sidewalls. However, the disclosure is not limited thereto. In other embodiments, the waveguide structure 210 and the grating bars 211_1 to 211_4 are provided with tilted sidewalls. For example, the included angle between the sidewall and bottom of each of the waveguide structure 210 and the grating bars 211_1 to 211_4 ranges from about 60 to 85 degrees, such as about 75-80 degrees.

In the above embodiments of FIG. 7, the pitches of the grating bars 211_1 to 211_4 are gradually increased away from the waveguide structure 210. However, the disclosure is not limited thereto. In other embodiments, the grating bars 211_1 to 211_4 can have other configurations, as shown in FIG. 8 to FIG. 9.

Figure 8:
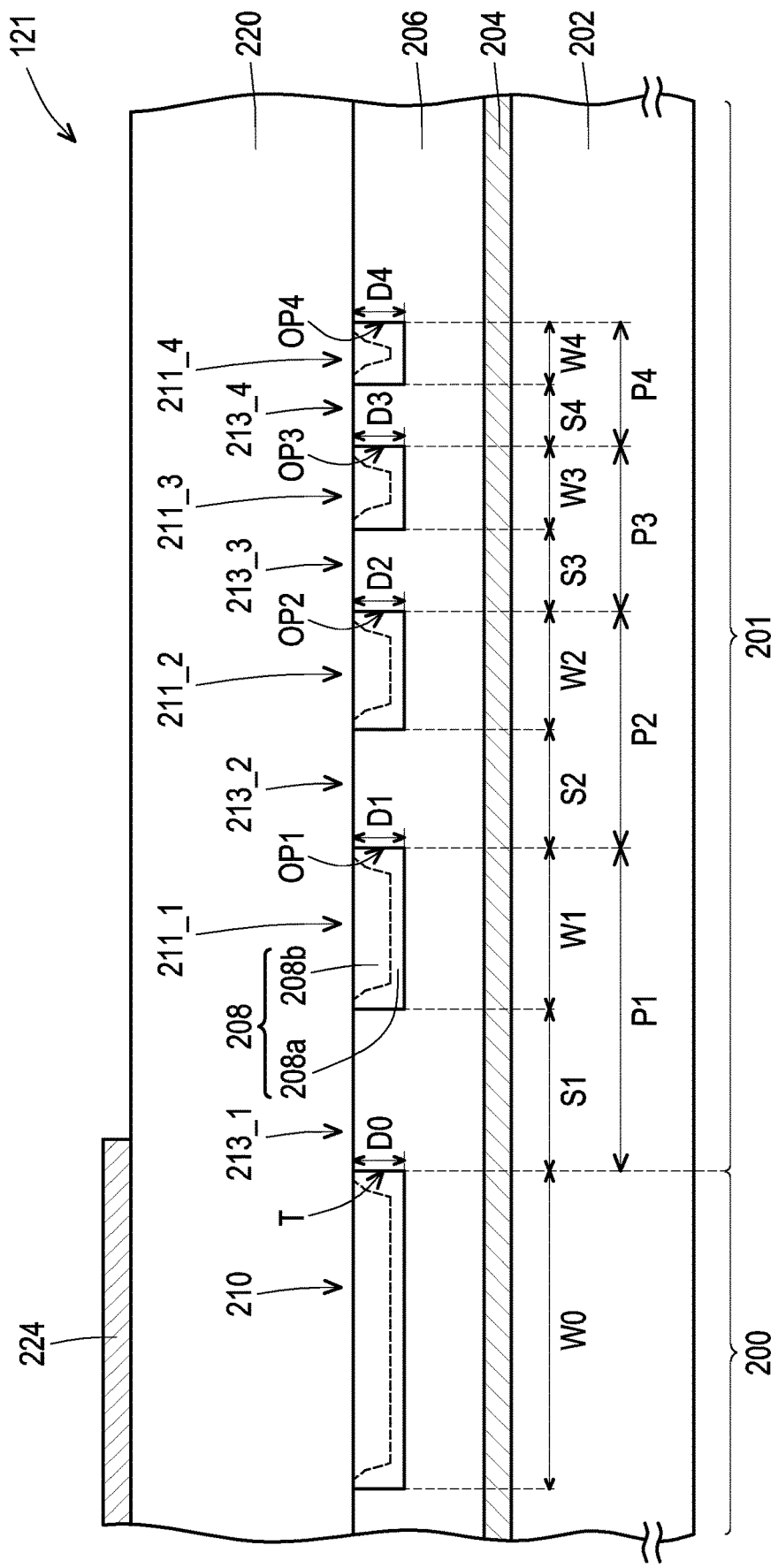
FIG. 8 to FIG. 13 illustrate exemplary grating coupler structures in accordance with some embodiments of the present disclosure.
Figure 9:
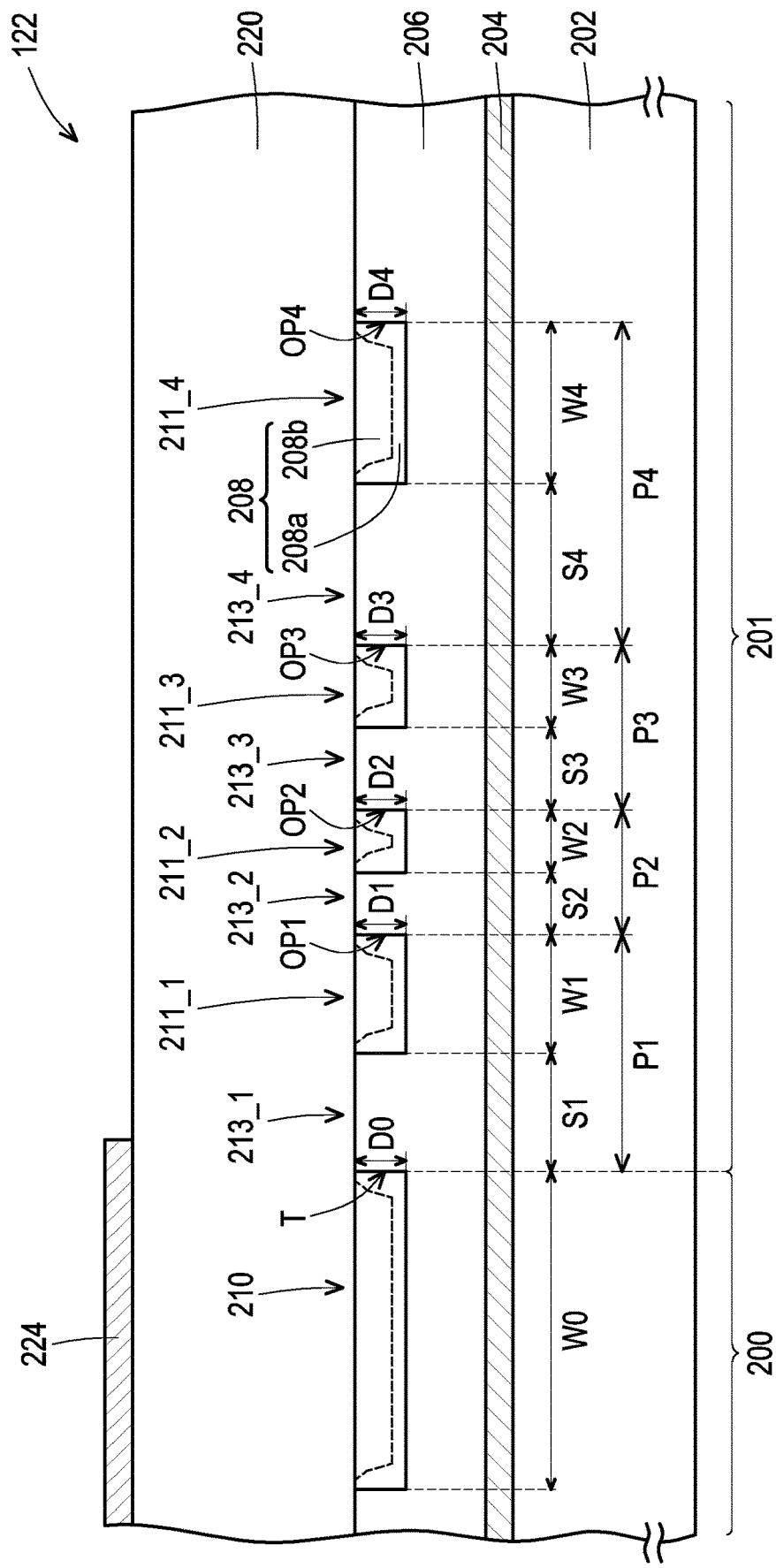

In some embodiments, the pitches of the grating bars 211_1 to 211_4 are gradually reduced away from the waveguide structure 210, as shown in FIG. 8. Specifically, in the grating coupler structure 121 of FIG. 8, the first pitch P1 is more than the second pitch P2, the second pitch P2 is more than the third pitch P3, and the third pitch P3 is more than the fourth pitch P4.

In some embodiments, the pitches of the grating bars 211_1 to 211_4 are randomly disposed across the grating region 201. Specifically, in the grating coupler structure 122 of FIG. 9, the smaller pitches P2 and P3 are arranged in the center zone of the grating region 201, and the larger pitches P1 and P4 are arranged in the edge zone of the grating region 201.

The shapes and configurations of the grating bars of a grating structure are not limited to the disclosure. It is appreciated by people having ordinary skill in the art that other shapes and configurations of the grating bars are possible. In other words, the grating bars are contemplated as falling within the spirit and scope of the present disclosure, as long as the grating bars can produce the desired intensity profile along the propagation direction (or called the radius direction) to the waveguide structure.

Figure 10:
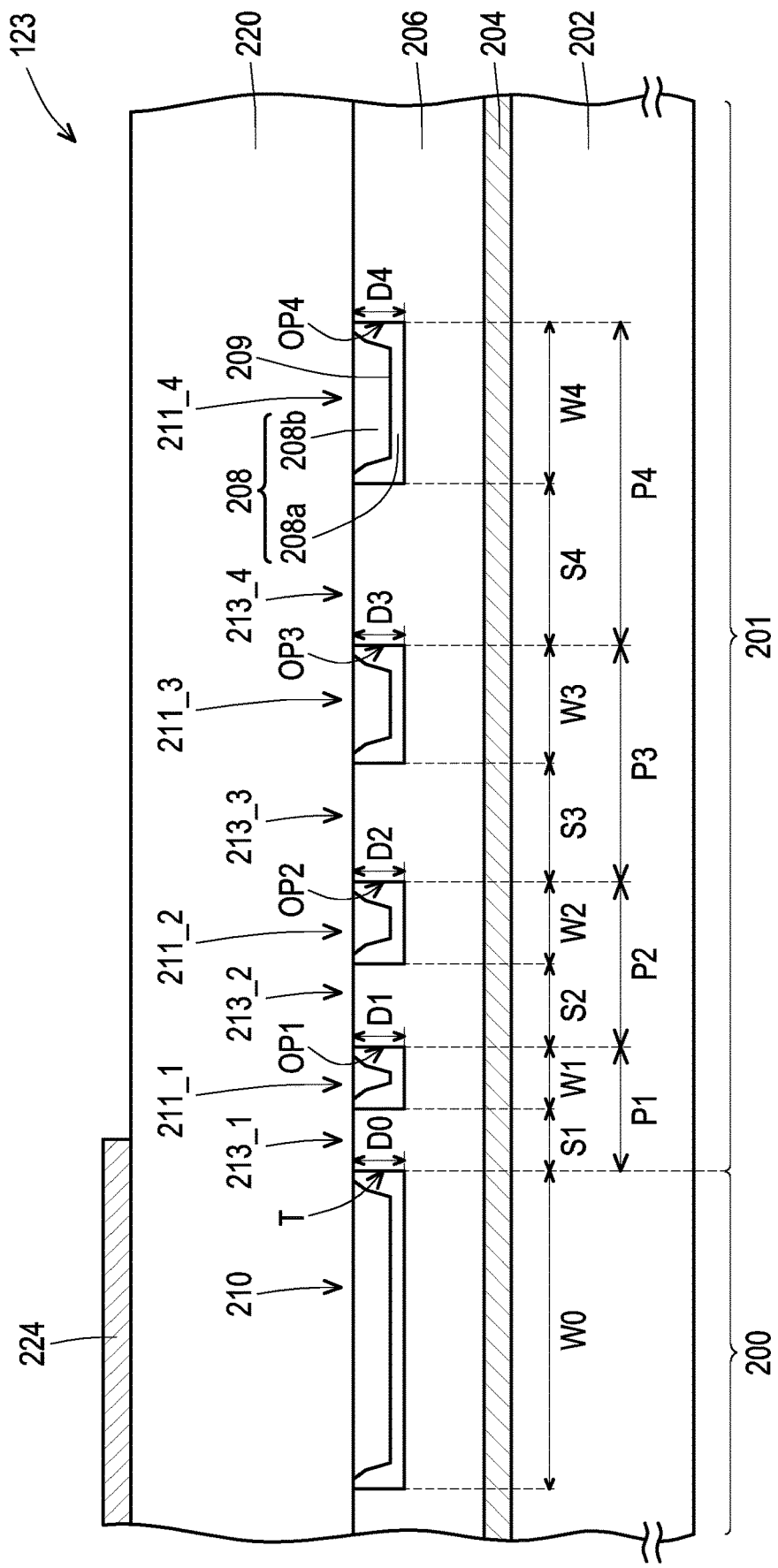
Figure 11:
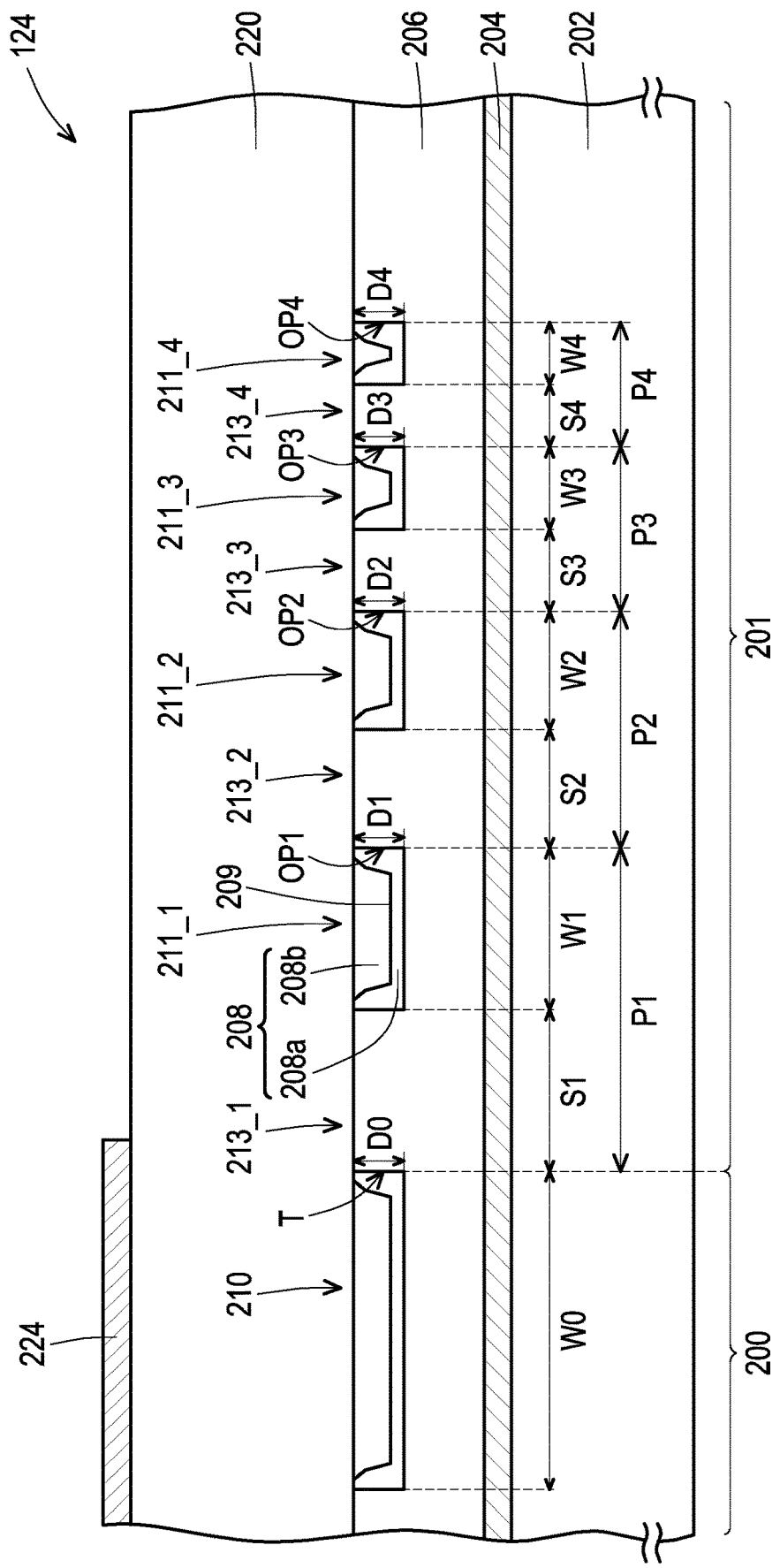
Figure 12:
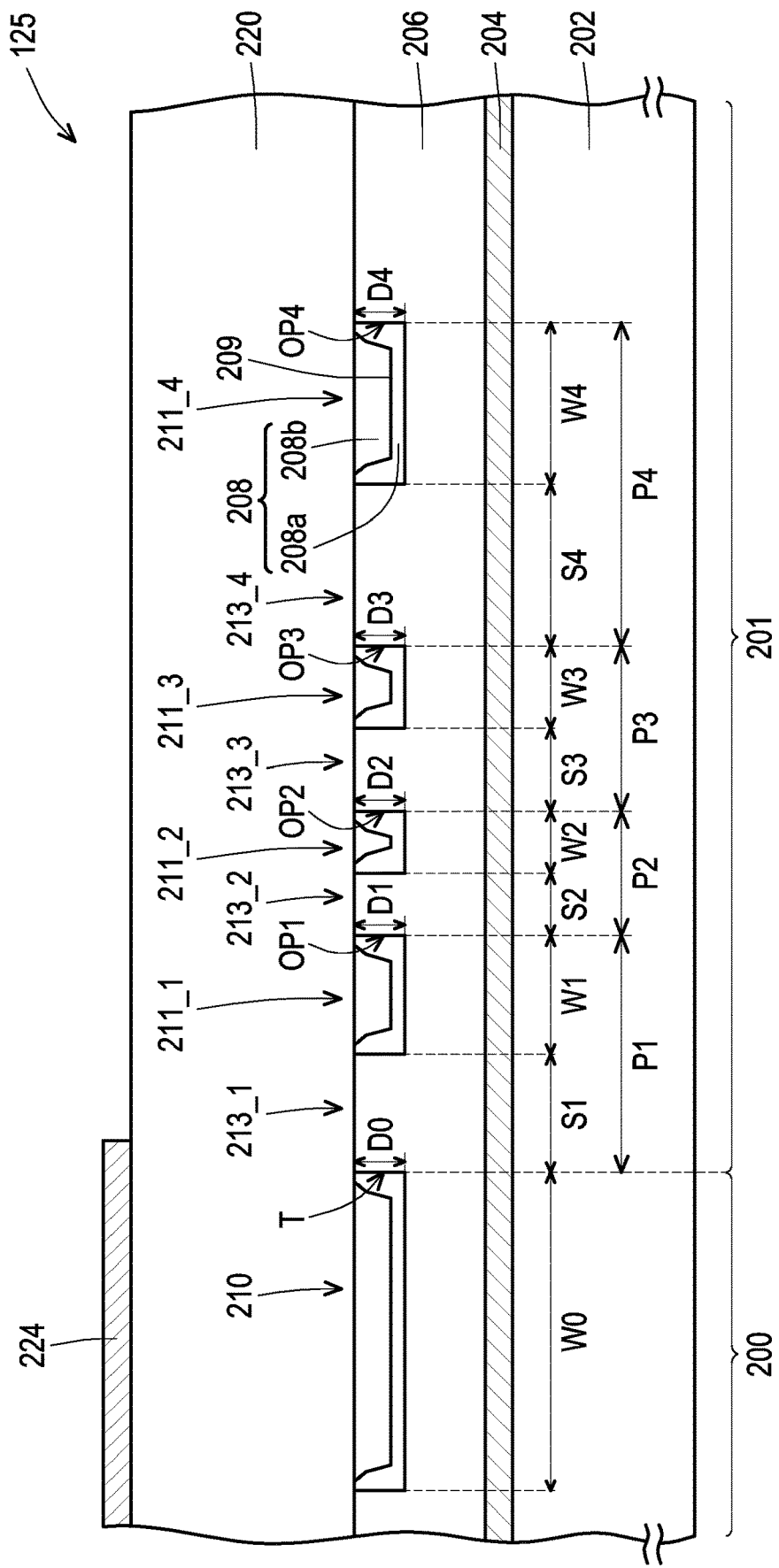

In the above embodiments of FIG. 7 to FIG. 9, the interface between the first filling layer 208a and the second filling layer 208b is invisible, because the first filling layer 208a and the second filling layer 208b are made by the same material. However, the disclosure is not limited thereto. In other embodiments, the first filling layer 208a and the second filling layer 208b are made by different materials, so an interface 209 is present between the first filling layer 208a and the second filling layer 208b, as shown in the grating coupler structure 123 to 125 in FIG. 10 to FIG. 12. In some embodiments, each of the first filling layer 208a and the second filling layer 208b includes silicon (e.g., polysilicon or amorphous silicon), silicon oxide, silicon nitride, silicon oxynitride, silicon carbide, or the like. For example, the first filling layer 208a is a silicon layer, and the second filling layer 208b is a silicon nitride layer. For example, the first filling layer 208a is a silicon nitride layer, and the second filling layer 208b is a silicon oxynitride layer. For example, the first filling layer 208a is a silicon nitride layer, and the second filling layer 208b is a silicon oxide layer.

The above embodiments in which one waveguide structure is provided for illustration purposes, and are not construed as limiting the present disclosure. In other embodiments, two waveguide structures may be provided as needed.

Figure 13:
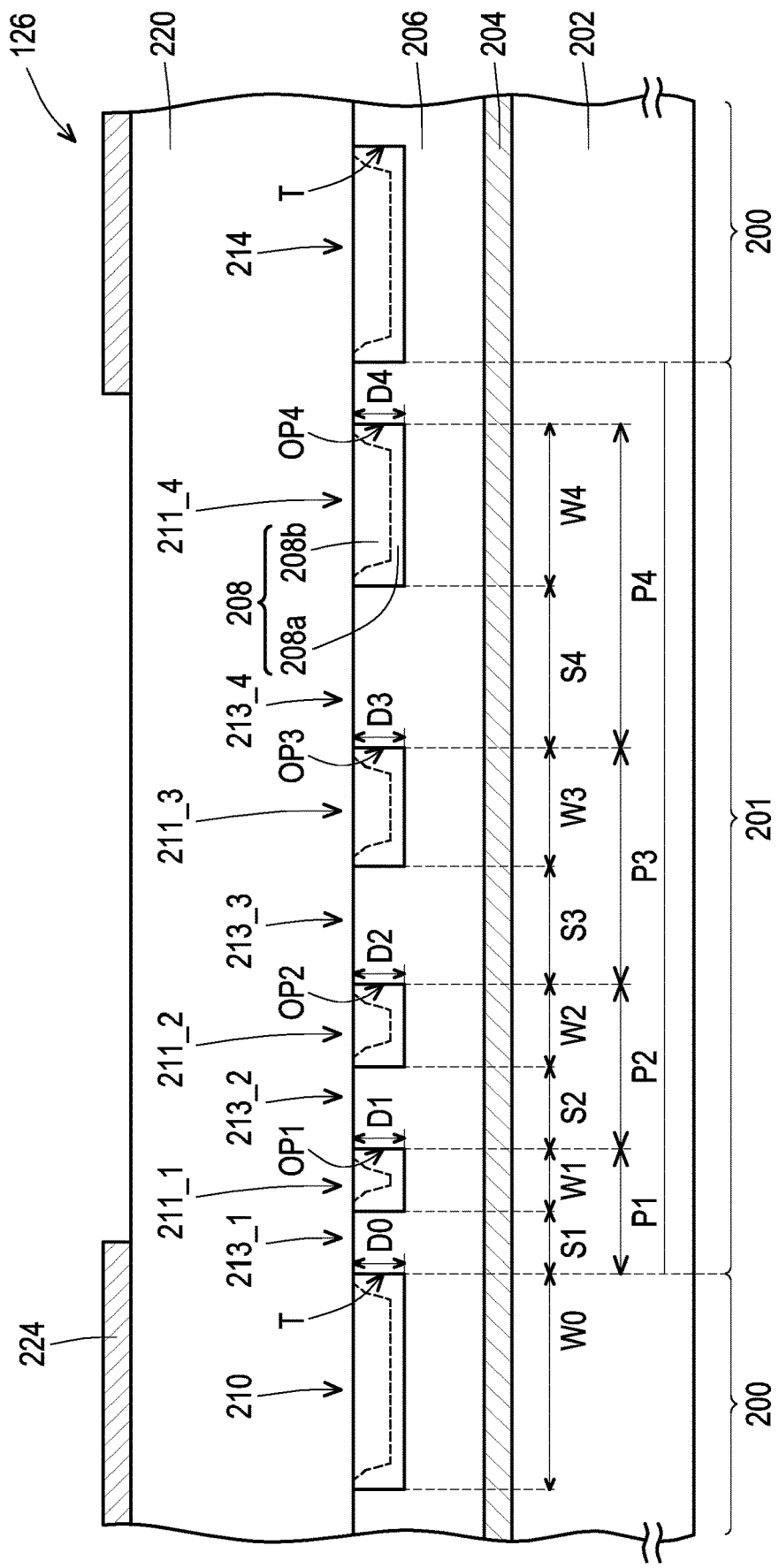

FIG. 13 illustrates an exemplary grating coupler structure in accordance with some embodiments of the present disclosure. The structure of FIG. 13 is similar to the structure of FIG. 7, so the difference is described below, and the similarity is not iterated herein.

In the grating coupler structure 126 in FIG. 13, the substrate 202 has a grating region 201 and two waveguide regions 200 at two sides of the grating region 201. Two waveguide structures 210 and 214 are disposed on the substrate 202 in the waveguide regions 200, respectively. Specifically, a waveguide structure 210 is provided at a first side of the grating structure 212, and additional waveguide structure 214 is further provided at a second side of the grating structure 212. The second side is opposite to the first side. In some embodiments, the waveguides structures 210 and 214 have the same material configuration and formed simultaneously in the same process steps. However, the disclosure is not limited thereto. In other embodiments, the waveguides structures 210 and 214 have different material configurations and formed separately in different process steps.

In some embodiments, when the angle of the optical fiber of the optical fiber array 108 is configured in a range of about 5-15 degrees, the waveguide structure 214 functions as a dummy waveguide structure.

In other embodiments, when the angle of the optical fiber of the optical fiber array 108 is configured in a range of about 0-4 degrees, the waveguide structure 214 functions as an active waveguide structure.

The additional waveguide structure 214 can be provided for the grating coupler structures 121-125 in FIG. 8 to FIG. 12, upon the process requirements.

The structures of the integrated optical devices of the disclosure are described below with reference to FIG. 7 to FIG. 13. In some embodiments, the integrated optical device (e.g., grating coupler structures 120/121/122/123/124/125/126) includes a substrate 202, a waveguide structure 210 and a grating structure 212. The substrate 202 has a waveguide region 200 and a grating region 201 adjacent to each other. In some embodiments, the waveguide region 200 and the grating region 201 are laterally disposed side by side. The waveguide structure 210 is disposed on the substrate 202 in the waveguide region 200. The grating structure 212 is disposed on the substrate 202 in the grating region 201. In some embodiments, the grating structure 212 includes grating bars 211_1 to 211_4 and grating intervals 213_1 to 213_4 arranged alternately, and widths W1 to W4 of the grating bars 211_1 to 211_4 of the grating structure 212 are varied.

In some embodiments, an i-th grating bar is narrower than an (i+1)-th grating bar, i is a positive integer, and the i-th grating bar is closer to the waveguide structure 210 than the (n+1)-th grating bar. Please refer to FIG. 7, FIG. 10, and FIG. 13.

In some embodiments, an i-th grating bar is wider than an (i+1)-th grating, i is a positive integer, and the i-th grating bar is closer to the waveguide structure than the (i+1)-th grating bar. Please refer to FIG. 8 and FIG. 11.

In some embodiments, widths of the grating intervals of the grating structure are varied. Please refer to FIG. 7 to FIG. 13.

In some embodiments, an i-th grating interval is narrower than an (i+1)-th grating interval, i is a positive integer, and the i-th grating interval is closer to the waveguide structure than the (i+1)-th grating interval. Please refer to FIG. 7, FIG. 10, and FIG. 13.

In some embodiments, an i-th grating interval is wider than an (i+1)-th grating interval, i is a positive integer, and the i-th grating interval is closer to the waveguide structure than the (i+1)-th grating interval. Please refer to FIG. 8 and FIG. 11.

In some embodiments, each of the grating bars of the grating structure includes silicon, silicon nitride, silicon carbide or a combination thereof. In some embodiments, the waveguide structure and the grating bars of the grating structure are made by the same material. In some embodiments, the waveguide structure and the grating bars of the grating structure are encapsulated by an insulating material.

Figure 14:
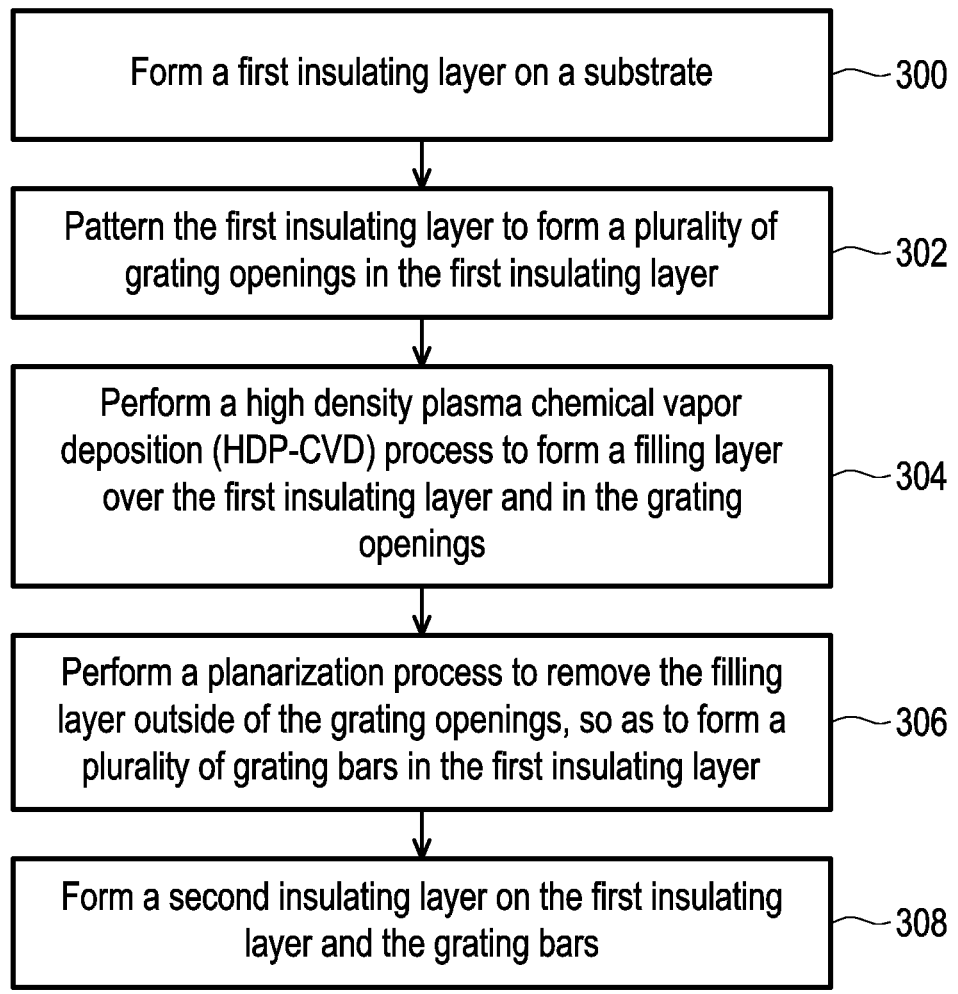
FIG. 14 illustrates a method of forming an exemplary grating coupler structure in accordance with some embodiments of the present disclosure.

FIG. 14 illustrates a method of forming an exemplary grating coupler structure in accordance with some embodiments of the present disclosure. Although the method is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 300, a first insulating layer is formed on a substrate. FIG. 3 illustrates a cross-sectional view corresponding to some embodiments of act 300.

At act 302, the first insulating layer is patterned to form a plurality of grating openings in the first insulating layer. FIG. 4 illustrates a cross-sectional view corresponding to some embodiments of act 302. In some embodiments, widths of the grating openings are varied. In some embodiments, widths of the grating openings are gradually changed (e.g., reduced or increased) towards a direction. In some embodiments, distances between the grating openings are varied.

At act 304, a high density plasma chemical vapor deposition (HDP-CVD) process is performed to form a filling layer over the first insulating layer and in the grating openings. FIG. 5 illustrates a cross-sectional view corresponding to some embodiments of act 304. In some embodiments, a material of the filling layer comprises silicon, silicon nitride, silicon oxynitride, silicon carbide or a combination thereof.

At act 306, a planarization process is performed to remove the filling layer outside of the grating openings, so as to form a plurality of grating bars in the first insulating layer. FIG. 6 illustrates a cross-sectional view corresponding to some embodiments of act 306.

At act 308, a second insulating layer is formed on the first insulating layer and the grating bars. FIG. 7 illustrates a cross-sectional view corresponding to some embodiments of act 308.

Figure 15:
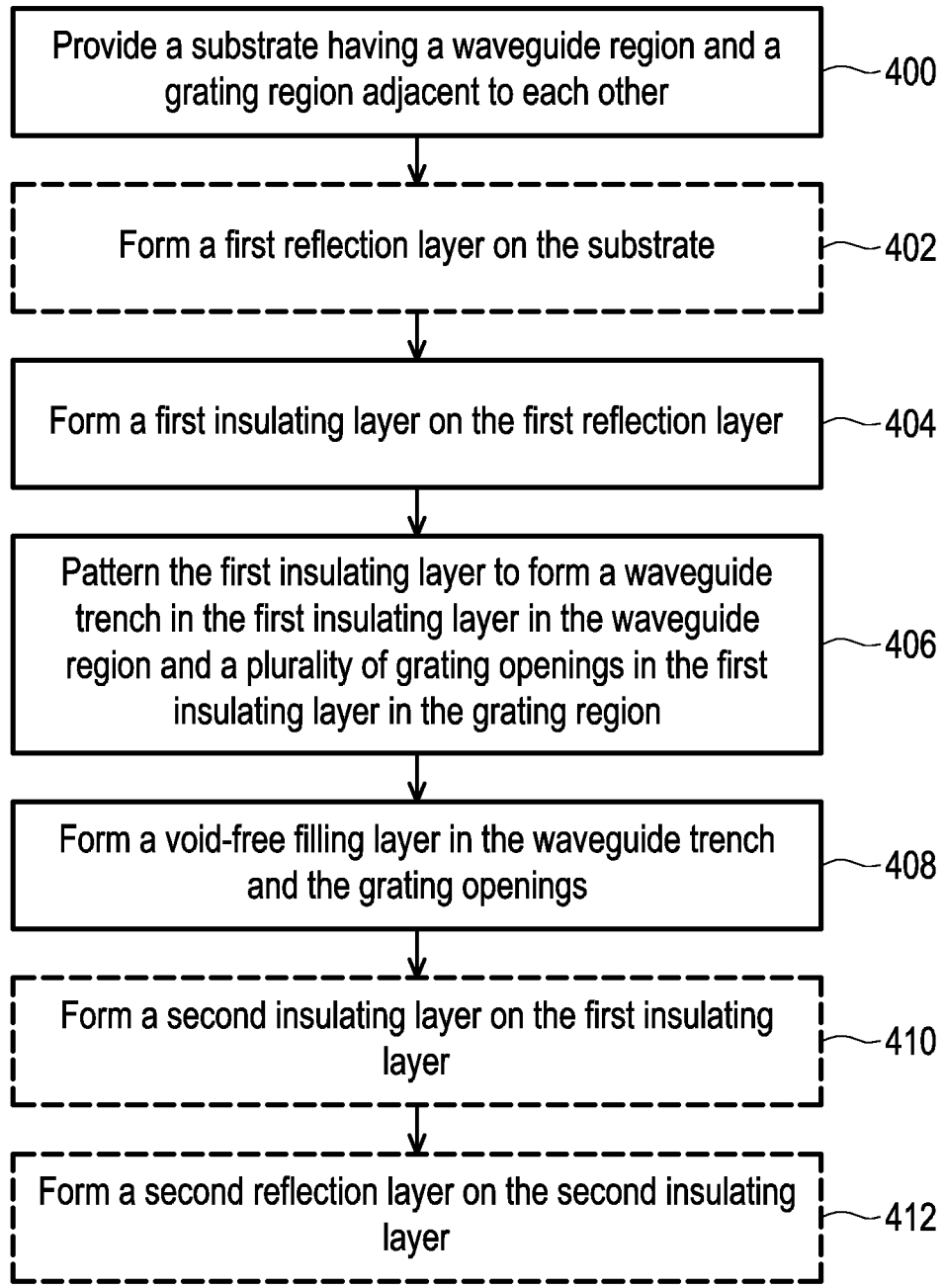
FIG. 15 illustrates a method of forming an exemplary grating coupler structure in accordance with some embodiments of the present disclosure.

FIG. 15 illustrates a method of forming an exemplary grating coupler structure in accordance with some embodiments of the present disclosure. Although the method is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 400, a substrate is provided with a waveguide region and a grating region adjacent to each other. FIG. 3 illustrates a cross-sectional view corresponding to some embodiments of act 400.

At act 402, a first reflection layer is formed on the substrate. FIG. 3 illustrates a cross-sectional view corresponding to some embodiments of act 402. In some embodiments, the first reflection layer is formed across the waveguide region and the grating region. Act 402 is optional and may be omitted as needed.

At act 404, a first insulating layer is formed on the first reflection layer. FIG. 3 illustrates a cross-sectional view corresponding to some embodiments of act 404.

At act 406, the first insulating layer is patterned to form a waveguide trench in the first insulating layer in the waveguide region and a plurality of grating openings in the first insulating layer in the grating region. FIG. 4 illustrates a cross-sectional view corresponding to some embodiments of act 406. In some embodiments, widths of the grating openings are varied.

At act 408, a void-free filling layer is formed in the waveguide trench and the grating openings. FIG. 5 and FIG. 6 illustrate cross-sectional views corresponding to some embodiments of act 408. In some embodiments, the void-free filling layer is formed by a high density plasma chemical vapor deposition (HDP-CVD) process.

At act 410, a second insulating layer is formed on the first insulating layer. FIG. 7 illustrates a cross-sectional view corresponding to some embodiments of act 410. Act 410 is optional and may be omitted as needed.

At act 412, a second reflection layer is formed on the second insulating layer. FIG. 7 illustrates a cross-sectional view corresponding to some embodiments of act 412. In some embodiments, the second reflection layer is formed on the waveguide region. Act 412 is optional and may be omitted as needed.

In the disclosure, the grating structure have non-periodic grating bars and/or non-periodic grating intervals, so as to produce the desired intensity profile along the propagation direction (or called the radius direction) to the waveguide structure. With the method of the disclosure, the conventional slit voids in the grating bars and protrusions protruded outwardly from tops of the grating bars are not observed. In some embodiments, a high density plasma chemical vapor deposition (HDP-CVD) process is performed, so as to form a void-free grating bars and waveguide, and therefore enhance the coupling efficiency and improve the wavelength shift issue.

The various embodiments or examples described herein offer several advantages over the existing art, as set forth above. It will be understood that not all advantages have been discussed herein, no particular advantage is required for all embodiments or examples, and other embodiments or examples may offer different advantages.

According to some embodiments of the disclosure, an integrated optical device includes a substrate, a waveguide structure and a grating structure. The substrate has a waveguide region and a grating region adjacent to each other. The waveguide structure is disposed on the substrate in the waveguide region. The grating structure is disposed on the substrate in the grating region. In some embodiments, the grating structure includes grating bars and grating intervals arranged alternately, and widths of the grating bars of the grating structure are varied.

According to some embodiments of the disclosure, a method of forming an integrated optical device includes: forming a first insulating layer on a substrate; patterning the first insulating layer to form a plurality of grating openings in the first insulating layer; performing a high density plasma chemical vapor deposition (HDP-CVD) process to form a filling layer over the first insulating layer and in the grating openings; performing a planarization process to remove the filling layer outside of the grating openings, so as to form a plurality of grating bars in the first insulating layer; and forming a second insulating layer on the first insulating layer and the grating bars.

According to some embodiments of the disclosure, a method of forming an integrated optical device includes: providing a substrate having a waveguide region and a grating region adjacent to each other; forming a first reflection layer on the substrate; forming a first insulating layer on the first reflection layer; patterning the first insulating layer to form a waveguide trench in the first insulating layer in the waveguide region and a plurality of grating openings in the first insulating layer in the grating region; forming a void-free filling layer in the waveguide trench and the grating openings; forming a second insulating layer on the first insulating layer; and forming a second reflection layer on the second insulating layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an integrated optical device, comprising:
    forming a first reflection layer on a substrate;
    forming a first insulating layer on the first reflection layer;
    patterning the first insulating layer to form a plurality of grating openings in the first insulating layer;
    performing a high density plasma chemical vapor deposition (HDP-CVD) process to form a filling layer over the first insulating layer and in the grating openings;
    performing a planarization process to remove the filling layer outside of the grating openings, so as to form a plurality of grating bars in the first insulating layer;
    forming a second insulating layer on the first insulating layer and the grating bars, and
    forming a second reflection layer on the second insulating layer,
    wherein the first reflection layer is overlapped with the grating bars.

2. The method of claim 1, wherein widths of the grating openings are varied.

3. The method of claim 1, wherein the second reflection layer is misaligned with the grating bars.

4. The method of claim 1, wherein widths of the grating openings are gradually changed towards a direction.

5. The method of claim 1, wherein distances between the grating openings are varied.

6. A method of forming an integrated optical device, comprising:
    providing a substrate having a waveguide region and a grating region adjacent to each other;
    forming a first reflection layer on the substrate;
    forming a first insulating layer on the first reflection layer;
    patterning the first insulating layer to form a waveguide trench in the first insulating layer in the waveguide region and a plurality of grating openings in the first insulating layer in the grating region;
    forming a void-free filling layer in the waveguide trench and the grating openings;
    forming a second insulating layer on the first insulating layer; and
    forming a second reflection layer on the second insulating layer.

7. The method of claim 6, wherein the void-free filling layer is formed by a high density plasma chemical vapor deposition (HDP-CVD) process.

8. The method of claim 6, wherein widths of the grating openings are varied.

9. The method of claim 6, wherein the first reflection layer is formed across the waveguide region and the grating region.

10. The method of claim 6, wherein the second reflection layer is formed on the waveguide region.

11. A method of forming an integrated optical device, comprising:
    providing a substrate having a waveguide region and a grating region adjacent to each other;
    forming a first reflection layer on the substrate;
    forming a first insulating layer on the first reflection layer;
    patterning the first insulating layer to form a waveguide trench in the first insulating layer in the waveguide region and a plurality of grating openings in the first insulating layer in the grating region, wherein widths of the grating openings are varied; and
    forming a filling layer in the waveguide trench and the grating openings to form a waveguide structure and a grating structure comprising grating bars with varied widths, wherein a top surface of the filling layer is flushed with a top surface of the waveguide structure and a top surface of the grating structure.

12. The method of claim 11, wherein a method of forming the filling layer comprises:
    performing a cyclic deposition and sputtering process to form a filling material; and
    performing a planarization process to the filling material.

13. The method of claim 12, wherein the cyclic deposition and sputtering process comprises m cycles of deposition and sputtering steps, and m is a positive integer.

14. The method of claim 13, wherein m is an integer from 2 to 5.

15. The method of claim 11, further comprising forming a second insulating layer on the first insulating layer covering the waveguide structure and the grating structure.

16. The method of claim 15, further comprising forming a second reflection layer on the second insulating layer.

17. The method of claim 16, wherein the second reflection layer is formed on and corresponding to the waveguide structure.

18. The method of claim 11, wherein an i-th grating bar is narrower than an (i+1)-th grating bar, i is a positive integer, and the i-th grating bar is closer to the waveguide structure than the (i+1)-th grating bar.

19. The method of claim 11, wherein an i-th grating bar is wider than an (i+1)-th grating, i is a positive integer, and the i-th grating bar is closer to the waveguide structure than the (i+1)-th grating bar.

20. The method of claim 11, wherein the grating structure further comprises grating intervals, the grating intervals and the grating bars are laterally disposed and arranged alternately, and widths of the grating intervals of the grating structure are varied.

* * * * *